March 4, 1958 L. J. BARKER 2,825,122
TOOL BAR FOR TURRET LATHE
Filed May 11, 1953
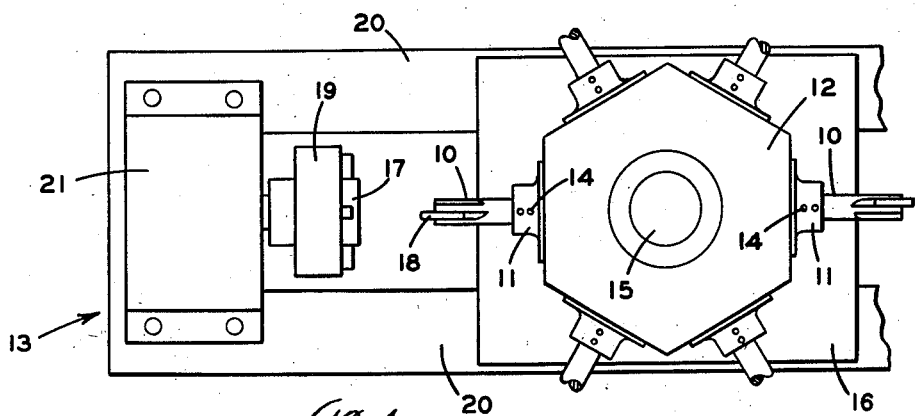
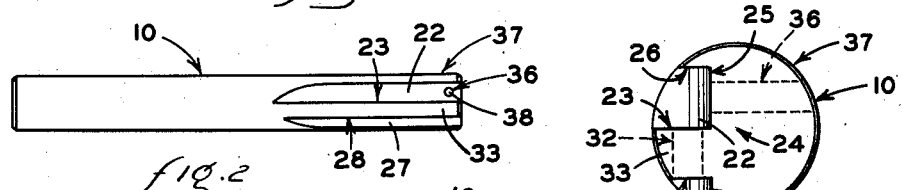
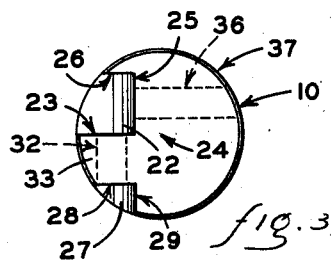
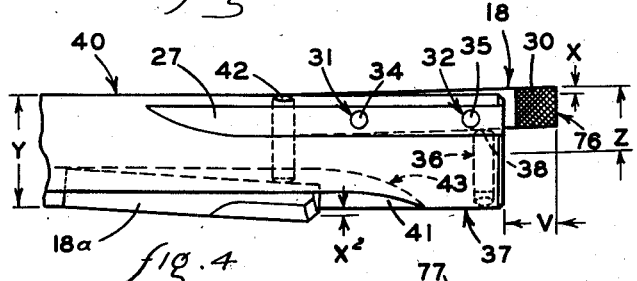
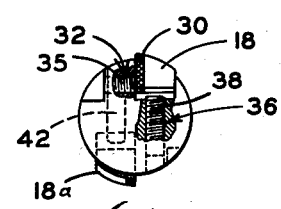
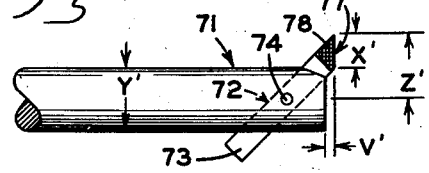
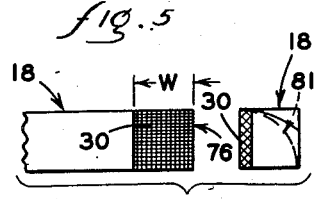
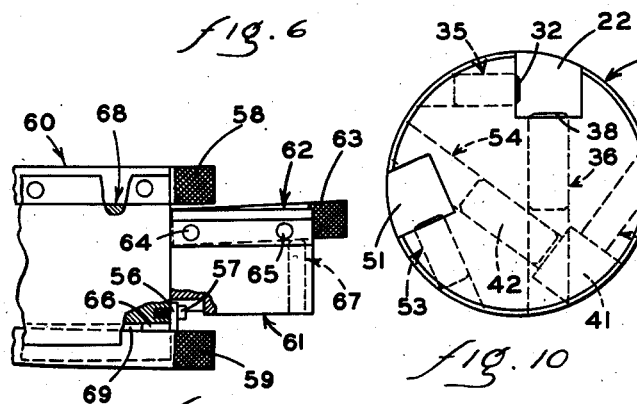
INVENTOR.
LAYMAN J. BARKER
BY
Raywood H. Blanchard

United States Patent Office 2,825,122
Patented Mar. 4, 1958

2,825,122

TOOL BAR FOR TURRET LATHE

Layman J. Barker, Battle Creek, Mich., assignor to Buck Tool Company, Kalamazoo, Mich., a corporation of Michigan Application May 11, 1953, Serial No. 354,358

1 Claim. (Cl. 29—98)

This invention relates to an adapter for holding a lathe tool and more particularly to a type of such adapter generally known as a tool bar mountable upon the turret of a turret late for supporting a tool such as a bit.

Persons familiar with the operation of lathes, particularly in large production machine shops, have long recognized the serious losses sustained both by industry and by employees, especially those doing piece work under an incentive program, due to the frequent breakage of the bits or tools during the operation of a turret lathe. In the first place, each time a bit is broken, regardless of whether it can be repaired by grinding, time is lost both to the employer and employee while the bit is being replaced. In most shops, either the repairing or replacing requires the employee to go to the tool crib for such replacement or repairing. If the bit cannot be repaired, which is usually the case under present conditions, the employer also suffers the additional loss of the cost of the bit. Where bits having hardened, such as "carboloy" or "stellite," cutting tips are used, this cost can be extremely high over a short period of time, as will be seen hereinafter.

Bit breakage also has an indirect psychological effect upon production, especially in shops having incentive programs. Excessive bit breakage occurring at the beginning of a shift renders hopeless the employee's chance of making the job rate. Thus the employee becomes discouraged, which is directly reflected by a substantial reduction in his output for the remainder of that shift.

Tool bars presently in use, and hereinafter referred to as standard bars, are designed in all instances known to applicant from a cylindrical bar of steel containing a diagonal opening therethrough in which the tool bit is inserted. Since general purpose bits have rectangular tips, these tips must be immediately ground on a bias or diagonal to the lengthwise extent of the bit, where any kind of facing, boring, counterboring or reaming operation is to be performed. Thus, approximately 50% of the cutting tip must be ground off, as seen hereinafter, before the operation can even begin. This is not only a waste of the cutting tip material, but results in virtually eliminating any repair of the tip in the event it is chipped during the boring operation. The reason for this is that in order to remove a chip of any size, the cutting edge will require grinding beyond the available extent of the carboloy or other cutting tip, where it has been ground on the diagonal. This point will be dealt with in more detail hereinafter.

In addition to the losses arising out of the way in which tools must be ground for use with standard bars, it has been found through years of experience that bits held in standard bars tend to chatter, thus increasing the incidence of bit breakage. Such chattering is caused by (1) the non-rigidity of the standard bar, (2) the excessive lateral or radial extent of the bit from the bar, (3) the small bit that must be used, (4) the pointed tip which results from the diagonal grinding, (5) the excessive size and sloppiness of the bit opening required in the tool bar, (6) the short extent of such opening, and (7) the fact that in all standard bars except the largest, the bit is held therein by only one set screw, due to strength and space limitations. This chattering produces rough surfaces on the work piece where the tool engages it which necessitates several additional operations before the work piece is acceptable for use. Normally, with present standard bars, even relatively soft materials must first be bored and then reamed. With hard metals, such as forgings or flame cut, hard steel, the work piece must be rough bored, finished bored and then reamed. Each one of these operations increases the time required to do the job thereby reducing the revenue both to the manufacturing company, as well as to the piece worker. Obviously, it follows that the additional operations required by using the standard bar also increases the incidence for breakage of tool bits in proportion to the number of operations required to produce a finished piece.

Due to the way in which the tool bit extends diagonally and laterally from the standard bar, a smaller tool bar than is required for proper rigidity must be used in order to get the cutting edge of the bit ahead of the axial work end of the standard tool bar, as will be seen hereinafter. Even then it is virtually impossible for the cutting edge of the bit to extend more than a fraction of an inch beyond the axial end of the standard bar because, for every small amount that the bit extends ahead of the axial end of the tool bar, it must also extend laterally or radially outwardly from the center of the tool bar, thereby substantially altering the diameter of the opening which it will cut, or changing the radial position of the bit to the surface which must be faced. Thus, especially where boring operations are being conducted, the axial end of the standard bar must accompany the bit into the bored opening and thereby pack the cut chips or shavings into a very small space. Accordingly, in many, many instances the chips and shavings pile up inside the bored opening and jam the bit, thereby causing bit breakage for another reason.

Lateral adjustment of the bit with respect to the standard bar requires longitudinal movement of the bit which, accordingly, alters its cutting depth. This necessitates readjustment of the turret and is extremely inaccurate at best.

Due to the bit opening required in standard bars, only one bit can be adjustably mounted upon a single bar. Thus, each operation requires a separate tool bar and an additional indexing of the turret for all practical purposes. Even if additional tools could be mounted on said standard bar, the increased torque imposed upon an already overloaded, relatively small diameter bar would create intolerable chatter and excessive rejects.

In an effort to overcome the above mentioned, critical problems, the turret is sometimes abandoned for a cross-slide. Here, the boring or facing operation is conducted by inserting the tool in the cored or drilled opening in the work piece and drawing the tool radially outwardly. However, such an operation sacrifices the recognized utility of the turret, is far less efficient, much slower and necessitates excessive undercutting of the bit so that all but its cutting edge will clear the internal surface of the opening in the work piece. The net result is a much weaker bit, a correspondingly larger bit breakage, a reduction in output, and much poorer quality in the finished article.

Thus, it is observed from the above that the present or standard bars leave much to be desired. Yet, such bars have been in use as standard equipment as far back as most living machinists can remember with little or no change in their structure, application or use.

Accordingly, a primary object of my invention is the provision of a virtually revolutionary tool bar for supporting a bit or tool upon the turret or rotary head of a turret lathe.

A further object of my invention is the provision of a completely different tool bar, as aforesaid, (1) which, for a given operation, such as boring an opening in a work piece, can be much larger in diameter than standard tool bars for the same operation and, therefore, much sturdier and much more rigid than such standard bars, thereby virtually eliminating the bar's contribution to chattering; (2) in which the tool extends laterally or radially from the center-line of the bar a minimum distance further than the radius of the bar, instead of a great distance as in the case of standard bars; (3) in which a much larger and stronger bit can be used, with a given diameter bar, than is possible with standard bars of the same diameter; (4) in which the tool bit can be caused to extend beyond the axial end of the tool bar a much greater distance than possible with standard tool bars, thereby preventing interference of the bar with the chips for a much longer time before the bar enters the bore and, after said bar enters the bore, providing ample chip room within the bore thereby preventing breakage due to jammed chips or shavings; (5) which is so designed as to eliminate the wasteful grinding off of approximately 50% of the carboloy tip before the boring, facing or similar operation even begins, which operations comprise the major use of such a boring tool; and (6) which permits many times more regrindings of the cutting edge of the tool before the carboloy tip thereof has been used up than is possible on tools used with standard bars.

A further object of my invention is the provision of a tool bar, as aforesaid, upon which a plurality of tools may be mounted for effecting simultaneously several operations which heretofore have required individual successive, time wasting operations.

A further object of this invention is the provision of a tool bar, as aforesaid, which virtually eliminates the bit breakage encountered when using the conventional, standard tool bars.

A further object of this invention is the provision of a tool bar, as aforesaid, which is easy to manufacture, simple to operate and much easier to adjust the bit therein than existing tool bars.

A further object of this invention is the provision of a tool bar, as aforesaid, which, by eliminating chatter when used with standard bits, produces a finished surface on the initial cutting, thereby eliminating additional operations.

Numerous other objects and purposes of this invention exist and will become apparent to persons familiar with this type of equipment upon reading the following specification and upon examining the accompanying drawing in which:

Figure 1 is a top plan view of a fragment of a turret lathe with my tool bar mounted thereon.

Figure 2 is a top view of my tool bar.

Figure 3 is an outer end view of said tool bar.

Figure 4 is a fragmentary side view of my tool bar in a modified form with bits mounted thereon.

Figure 5 is a broken end view of the outer end of Figure 4.

Figure 6 is a fragmentary side view of a standard tool bar.

Figure 7 includes top and end views of a tool bit properly ground for use in my tool bar.

Figure 8 is a tool bit properly ground for use in a standard tool bar, as shown in Figure 6.

Figure 9 is a fragmentary side view of another modified form of my tool bar.

Figure 10 is an outer end view of a further modified form of my tool bar.

In meeting the objects and purposes stated above, as well as others related thereto, I have provided an elongated cylindrical bar having a longitudinal slot or groove therein near one end thereof, in which a tool or bit may be snugly received, and means for securing said bit within said groove. Further means is provided for adjusting the position of the cutting edge of said bit with respect to the axis of said bar.

For purposes of convenience in description, the terms "inner" and "outer" will have reference to the geometric center of the tool bar 10 or parts thereof, and the terms "work end" or "bit end" as used with reference to the tool bar 10 will have reference to the end thereof which extends from the turret head and supports the bit.

*Detailed description*

As shown in Figure 1, my tool bar or adapter 10 is insertable into and mountable upon the hub 11 on any one of the several faces of the turret or rotary head 12 of a turret lathe 13 by means of set screws 14 in a conventional manner. My tool bar 10 is preferably an elongated cylindrical bar which can be constructed from shafting. It will be recognized that my tool bar is preferably cylindrical, but can, within the purview of this invention, be other than cylindrical, such as octagonal or hexagonal. The turret 12 is rotatably mounted upon a shaft 15 supported upon the turret bed 16 for lengthwise movement upon the ways 20 in a conventional manner. The work piece 17, to be engaged by the bit 18 mounted on the bar 10, is held by a chuck 19 for conventional rotation thereof by the motor 21 or other prime mover, which is in turn mounted on one end of the lathe ways 20.

In its simplest form, as shown in Figures 2 and 3, my tool bar 10 has a lengthwise bit slot or groove 22 having an inner lateral face 23 coincident with a plane passing through the axis 24 of the tool bar. The depth of the bit groove 22 along said inner face is preferably approximately equal to the lateral width of the tool bit 18 along the side thereof having the cutting tip 30 (Figure 7) such as of carboloy. The bottom face 25 of the groove 22 is preferably perpendicular to the inner face 23, and is substantially equal in width to the corresponding dimension of the tool bit to be placed in said groove. The outer face 26 of the groove 22 is parallel with the inner face 23. Obviously, the widths of the faces 23 and 25 will vary with the size of the tool bit to be held therein. However, it will be recognized that for tool bits of smaller cross-sectional dimensions than the groove, shims may be used to take up the slack. The groove 22 can be made by a conventional milling machine in a conventional manner within the required tolerances.

An access slot or groove 27 may be provided, but is not absolutely necessary, longitudinally of the tool bar 10 (Figures 2 and 3). It has an inner face 28, spaced from and preferably parallel with the inner face 23 of the groove 22, and a bottom face 29 preferably parallel with the bottom face 25 of groove 22 and, in the preferred embodiment, coplanar therewith.

In one particular bar having a 1¾ inch diameter for supporting a ⅝ inch bit, the inner face 23 and the bottom face 25 of the slot or groove 22 are both ⅝ of an inch wide. In this particular construction, which is mentioned for illustrative purposes only, the inner face 28 of the groove 27 is ½ inch from the inner face 23 of the slot 22.

A pair of tapped openings 31 and 32, which are best shown in the modified form 40 disclosed in Figures 4 and 5, are provided through the wall 33 between the faces 23 and 28 and perpendicular thereto. A pair of locking or set screws 34 and 35 are received in said openings, respectively, for engaging the bit 18 for holding same rigidly and securely within the slot 22 against the outer face 26 thereof. A tapped opening 36 is provided through the bar 10 near the work end 37 thereof which communicates with the bottom face 25 of the groove 22 intermediate the lateral edges thereof and substantially perpendicularly thereto. An adjustment screw 38 is receivable into said tapped opening 36. In these respects bar 10 and modified bar 40 are identical. Thus, similar numerals are used to reflect such similarities.

The set screw 38 provides for radial adjustment of the bit 18 with respect to the bar 10 within the slot 22 as hereinafter shown. It will be apparent that other means, such for example as the shims 66 (Figure 9) may be employed to accomplish such adjustment and such means are contemplated within the scope of this application.

Figures 4 and 5 disclose a modified form 40 of my invention in which a secondary groove 41 is disposed on the diametrically opposite side of the bar 40 from the bit groove 22. For convenience, parts in the modified forms of my tool bar, which are identical in construction and function to those mentioned hereinabove with respect to the bar 10, will carry similar identifying numerals in the modified forms, as has been hereinbefore stated with respect to bar 40.

The tool or bit 18a disposed within the groove 41 may be utilized, for example, for chamfering the edge of an opening bored by the bit 18 held in the same bar. Thus, the bar 41 permits the simultaneous performance of two formerly independent operations. The secondary groove 41, aside from the fact that it does not extend through the work end of the tool bar 40, is substantially identical with the groove 22. As clearly shown in Figures 4 and 5, the adjustment screw 42 and set screws associated with the bit 18a and the groove 41 will in no way conflict with the bit 18 or set screws and adjustment screw associated therewith, since said screws are offset from each other.

Figure 10 illustrates a further modified form 50 of my invention in which there are two bit grooves 22 and 51 extending through the end of the tool bar. The bit groove 22 is identical with the bit groove shown in Figures 2 and 3, and the bit groove 41 is identical with the bit groove 41 in Figures 4 and 5 except that the grooves 22 and 41 are not diametrically opposed in Figure 10 as in Figures 4 and 5. The bit groove 51 provides a third such groove in a single bar, the three grooves being disposed at random angular positions about the periphery of the bar as desired or required. The bit groove 51 may, if desired, be designed to hold a different size bit than that held in groove 22. The adjustment screw is omitted with respect to the bit groove 51 inasmuch as instances will occur where, when several operations are being performed by the same bar, such adjustment is not required for all bits. However, adjustment means in one of the forms disclosed herein may be provided if desired or required. The tapped openings 32, 52 and 53 for the set screws locking the bits in the grooves 22, 41 and 51, respectively, may be provided in the bar 50 without access grooves, such as the groove 27 in bar 10. This prevents weakening of a bar having multiple bit grooves, such as the bar 50.

The topped opening 54 in the bar 50 (Figure 10) for the adjustment screw 42 will intersect the groove 51. However, this will cause no problem as the bit in groove 41 can be adjusted before a bit is placed in the groove 51.

The modified bar 60, shown in Figure 9, has a portion 61 at the work end thereof of reduced diameter, which contains a bit groove 62 substantially identical in position, construction and function with the groove 22 (Figures 2 and 3). A bit 63 is held in said groove 62 by means of set screws 64 and 65 for lateral adjustment by the adjustment screw 67 in the same manner described hereinabove with respect to bar 10 and bit 18.

The end of bar 60 adjacent to the portion 61 may be provided with one or more bit grooves disposed at random positions around the periphery of said bar 60. As shown, there are two bit grooves 68 and 69, in this particular embodiment, which are substantially identical to groove 22 in bar 10. The bits 58 and 59 are held in the grooves 68 and 69, respectively, by set screws in a manner described with respect to bar 10 and bit 18.

An alternative adjustment means comprising the shim 66, washer 56 and cap screw 57 are provided to adjust the bit 59 with respect to the axis of the bar 60. The shim 66 is held in the groove 69 beneath the bit 59 by means of the washer 56 which is held against the shim 66 by the screw 57. The adjustment may be accomplished by changing shims or by changing the position of a tapped shim, as shown herein.

By way of example, bar 60 can be used to perform simultaneously three operations normally requiring three separate standard bars. Bit 63 can bore, while bit 58 counterbores and bit 59 faces a work piece. Since the bar 60 has all the virtues of bar 10, the operations will be complete and acceptable after this one operation. Thus, the one bar 60 eliminates two finish boring operations and two reaming operations in addition to the separate counterboring and reaming operations, thereby combining a total of seven operations with standard bars into a single operation with my bar 60.

The operational advantages of my tool bar become more clearly apparent by comparison thereof with said standard tool bar. Thus, in aid of full disclosure, such comparison is presented in considerable detail.

Figure 6 illustrates a conventional, standard tool bar 71 presently in use and having a diagonally disposed tool opening 72 through said bar into which a tool bit 73 is inserted and held by set screw 74. The tool bar 71 and tool bit 73 are shown herein for cutting an opening of substantially the same diameter as the tool bar 10 and bit 18 (Figure 4) will cut. Thus, the relative merits of the standard tool bar and my improved tool bar can be easily compared. The standard bar 71 is shown with a tool opening 72 at approproximately a 45 degree angle to the axis of the bar. This is the average minimum angle between said tool 73 and the axis of the tool bar normally obtained. In most instances this angle is in the order of 60 to 75 degrees, thus further complicating its utility. As shown herein, the tool 72 is a ⅜ inch tool which is the usual, standard size for boring a 1¾ opening with a standard bar. The use of larger tool bits is prevented by strictly physical limitations.

Figures 7 and 8 show ⅝ inch and ⅜ inch tool bits, respectively, for use in my tool bar 10 and a standard tool bar 71, respectively. It will be observed that the ⅝ inch bit 18 has a cutting edge 76 substantially perpendicular to the lengthwise extent of the bit. The bit 73 has a diagonally ground cutting edge 77 which is necessitated for use thereof under similar and normal conditions with a standard bar 71, as shown in Figure 6. Thus, approximately 50% of the carboloy tip 78 on the bit 73 must be removed, as shown by dotted line 79, before bit 73 can perform its operation with standard bar 71. By comparison, virtually none of the carboloy surface 78 need be removed from the cutting edge of the bit 18 (Figure 7) to perform a similar operation with bar 10. In the bit 73 the maximum angle of the cutting edge 77 and the lengthwise axis of the bit is approximately 45 degrees, as shown in Figure 8. It will be noted that the angle between the cutting edge 77 and the bit 73 decreases as the angle between the bit opening 72 and the standard bar 71 increases in most operations. Thus, as shown in Figure 6, the bar 71 is set for average optimum results.

In the bit 18 a maximum angle of 90 degrees, thereby requiring no grounding of the cutting edge beyond sharpening same, may be obtained in many operations. When my cutting bar is used in its normal capacity, a minimum angle of approximately 87 degrees between the cutting edge 76 thereof and the longitudinal axis of the bit 18 is obtained.

With a 1¾ inch bar 10, by way of example only, the bit 18 can be adjusted with respect thereto to bore openings ranging from a 1¾ inch opening up to about a 2¼ inch opening. Such range of adjustment equals the minimum adjustment range of two successive sizes of standard tool bars 71 while eliminating their undesirable characteristics as stated herein. Said standard bars vary in diameter at the work end thereof by ¼ inch increments.

It has been found by actual application, as well as experimentation, that a 3 degree slope of the cutting edge 76 on the bit 18 from the normal will produce an acceptable facing surface or radial wall in a work piece within the normal adjustment range of the bar 10 and within the average allowable tolerances for acceptable work. In fact, the variation in said slope of the cutting edge 76 between the extremes of the adjustment range of the bit 18 on the bar 10 is less than can be accurately ground on the bit. Thus, a single bit 18 can, in most instances, be used with a given bar 10 for all boring, counterboring, facing and reaming operations throughout the bar's adjustment range. Further, such bit will be interchangeable between various bars, which is definitely not permissible with present tool bars.

The standard bar 71 is shown in approximately the maximum diameter which it may attain for boring an opening of the same size as that which would be bored by the bar 10 in Figure 4. It can be seen at a glance that a larger diameter bar can be used in place of bar 40 for more rigidity if required to bore the same opening. Conversely, the bar 40 could be used to bore a smaller opening, down to 1¾ inch diameter, whereas the bar 71 could not be used for boring a smaller opening without cutting off part of the carboloy tip and thereby reducing the length of the cutting edge and its future utility. To reduce the lateral extent of the bit 73 by adjustment would result in a reduction of the extent of the bit beyond the end of the bar 71 as well. Necessary chip clearance prevents this.

Operation

In operation, my tool bar 10, or one of the modified bars 40, 50 and 60, may first be inserted and locked in the hub 11 on a turret 12 on a lathe 13, after which the bit 18, or several similar bits, are mounted upon said bar. The bars 10 and 40, having a single bit slot or groove 22 extending through the work end thereof, are considered first. The bit 18 is placed snugly in said groove 22 so that the cutting edge 76 is substantially in the plane of the inner face or side 23 and extends beyond the work end 37 approximately ¾ inch. Said cutting edge has been previously sharpened so that it has about a 3 degree slope, or is at an angle of 87 degrees, in this particular embodiment, to the lengthwise extent of the bit 18. This slope is toward the bottom face 25 of said groove 22.

The set screws 34 and 35 are brought into snug, but not rigid, contact with said bit 18, thereby urging said bit snugly against the outer face or side 26 of said groove 22. A preliminary adjustment of the lateral extent of the tip end of the bit 18 is made with the adjustment screw 38. After measurement or a trial run, additional adjustments are made by screw 38 and the set screws 34 and 35 are then locked down on said bit 18.

Due to the structure and design of my bar 10, as well as the modified bars, the face 26 of groove 22 bears very nearly all of the load imposed by the cutting operation, whatever it may be. Thus, very little pressure is imposed upon either the set screws or the adjustment screw. Such as exists is shared between the three screws. In the standard bar 71 (Figure 6), a substantial pivotal force is imposed upon the single set screw 74 which must, in addition, counteract the force urging the bit 73 back through the bit opening 72. Because of the loose fit of the bit 73 within the opening 72, required to meet variations in bits of one size, the bit tends to work or pivot about the set screw 74 thereby increasing the size of the opening 72 and loosening the grip of the set screw 74. No such causes for inaccuracies and bit breakage can occur with bar 10. The groove 22 can be made sufficiently wide to accommodate variations in bits of the same size or bits of different sizes. In such case, elongated, flat shims of a conventional type may be inserted between the bit and the face 26.

A comparison of bar 10 and standard bar 71 discloses the following improvements in bar 10 which reduce bit breakage:

(1) The lateral extent X of the bit from the bar 10 is far less than such extent X' is or can be on bar 71.

(2) The diameter Y of bar 10 is nearly twice the maximum allowable diameter Y' of bar 71 for a boring operation in which Z, the radius of the opening with bar 10, is equal to Z', the radius of the same opening with bar 71. Since strength and rigidity are functions of cross-sectional area, and the area varies as the square of the radius, it can be seen that the bar 10, being larger in diameter, has an even greater rigidity than its diameter indicates.

(3) Bar 10 has a chip clearance V much greater than the chip clearance V' of bar 71.

(4) Bar 10 can accommodate a ⅝ inch bit, in this particular example, while bar 71 is limited to a ⅜ inch bit.

(5) A full tip bit 18 may be used in bar 10 thus providing regrinding space W much greater in length than the space W' on the diagonally cut tip of a bit 73 used in standard bar 71 for a similar operation. Furthermore, there is virtually no waste of the carboloy tip with bar 10 whereas about 50% of the tip must be ground away for use with bar 71.

When all of these factors are considered together, they result in, a more accurate, acceptable and efficient operation, with virtually no bit breakage, when using bar 10, instead of standard bar 71, presently in use.

The dotted line 81 in the end view of Figure 7 indicates the amount of bit which must be ground away where said bit must be held in the cross-slide to cut radially outwardly, as mentioned hereinabove. The bit is thereby weakened in a manner not required where my tool bar 10 is used.

The tool bar 40, having grooves 22 and 41, can be used to bore and face or chamfer simultaneously. If chamfering is accomplished by bit 18a (Figure 4), then $X^2$ is equal to X, for purposes of lateral adjustment. Grooves 22 and 41 on bar 40 are substantially identical in construction and function with groove 22 on bar 10, except that groove 41 is spaced from the work end 37 of bar 40. The bit 18a is adjustably held in place within groove 41 as hereinabove described with respect to bit 18 and groove 22 on bar 10.

The tool bars 50 and 60 have been fully described as to both construction and operation above. Thus it is believed sufficient to say that each bit mounted upon the bars 50 and 60 can enjoy all of the advantages of the bit 18 on the bar 10 over the bar 71. In addition, bars 50 and 60, as well as bar 40, can perform simultaneous, multiple operations upon a work piece neither possible nor conceivable with a standard bar 71.

The alternate adjustment means is disclosed on bar 60 with respect to the bit 59. Its operation is believed obvious from the above description.

Examples (1) On one job, the work pieces were flame cut (by acetylene torch) from hardened steel and required a counterbore having a radius 7/16 of an inch larger than the bore and 5/16 of an inch deep. This job was being worked on three, continuous and successive 8 hour shifts. Prior to use of my tool bar 10, the average output was about 60 pieces per shift. Due to the hardness of the steel, this piece had to be worked by the cross-slide which is a much slower operation, as mentioned hereinbefore. Furthermore, the advantages of the turret had to be abandoned when the cross-slide was used, the tool breakage was much higher, and the finished article was less accurate and of much poorer quality. Bit breakage was higher than average. After several days, my 1¾ inch bar 10 was used on one shift for 7 days with a ⅝ inch bit. During these 7 days my bar 10 used just one bit and cut 1105 pieces, or an average of 158 pieces per shift, thereby more than doubling the output. During this same period, the machinists using standard bar 71 on the same job on the other two shifts broke an average of 5 bits per day between them and could not increase their output beyond about 60 pieces per shift. My tool bar 10 produced in one operation a smoother bore than the other two shifts could produce with three operations on each piece.

(2) On a job requiring a similar counterbore operation, the incentive rate was 64 pieces per shift. With the standard bar 71, the best that any shift could attain was about 64 pieces per shift with separate rough bore, finish bore and ream operations. Upon use of my bar 10, the output increased to 96 pieces per shift by reducing the number of operations required while at the same time producing a smoother bore, a higher quality finished article, and no bit breakage.

Thus, I have disclosed and described several forms of my invention in preferred or particular embodiments thereof. However, such disclosure is not intended to eliminate other modifications or variations within the scope of my invention unless specifically stated to the contrary in the appended claim.

I claim:

A device for rigidly holding an elongated tool bit, comprising: an elongated bar having a lengthwise groove in the periphery thereof, said groove having a pair of substantially planar and parallel side walls between which a tool bit is slidably and substantially fully receivable, one of said side walls lying substantially within a plane including the lengthwise axis of said bar, said groove having a base wall connecting said side walls; means defining a first threaded opening extending transversely through said bar substantially parallel with said plane and communicating with said groove through said base wall near one end thereof; an angle adjusting screw arranged in said opening for adjusting the distance between the adjacent end of said bit and said axis of said bar, and thereby adjusting the angle between the lengthwise axis of said bit and said axis of said bar; means defining a plurality of threaded openings spaced lengthwise of, and extending transversely through, said bar substantially perpendicular to said first opening, said plurality of openings communicating with said groove through one side wall; a holding screw within each of said plurality of openings for holding at least the major portion of said tool bit firmly within said groove, the depth of said groove and the corresponding dimension of said bit being such that said angle between said axes of said bit and said bar is relatively small when said bit is engaged by said holding screws; one side of said tool bit lying substantially within said plane, and said screws being substantially within the confines of said bar.

References Cited in the file of this patent

UNITED STATES PATENTS

| | | |
|---|---|---|
| 1,063,982 | Larnce | June 10, 1913 |
| 2,385,010 | Lipani | Sept. 18, 1945 |
| 2,400,856 | Thompson | May 21, 1946 |
| 2,426,382 | Wilson | Aug. 26, 1947 |
| 2,551,948 | Hutchinson | May 8, 1951 |
| 2,699,595 | Milan | Jan. 18, 1955 |

FOREIGN PATENTS

| | | |
|---|---|---|
| 131,111 | Australia | Feb. 11, 1941 |